United States Patent
Malik et al.

(10) Patent No.: US 8,674,806 B1
(45) Date of Patent: Mar. 18, 2014

(54) END TO END EMERGENCY RESPONSE

(71) Applicants: Ajay Malik, Santa Clara, CA (US); Glenn Jonas, Cedarburg, WI (US); Leslie Roste, Prairie Village, KS (US); Zeljko John Serceki, Hartland, WI (US); Eric T. Heinze, Pewaukee, WI (US); Wyndham F. Gary, Jr., Whitefish Bay, WI (US)

(72) Inventors: Ajay Malik, Santa Clara, CA (US); Glenn Jonas, Cedarburg, WI (US); Leslie Roste, Prairie Village, KS (US); Zeljko John Serceki, Hartland, WI (US); Eric T. Heinze, Pewaukee, WI (US); Wyndham F. Gary, Jr., Whitefish Bay, WI (US)

(73) Assignee: RF Technologies, Inc., Brookfield, WI (US)

( * ) Notice: Subject to any disclaimer, the term of this patent is extended or adjusted under 35 U.S.C. 154(b) by 0 days.

(21) Appl. No.: 13/763,316

(22) Filed: Feb. 8, 2013

Related U.S. Application Data

(63) Continuation of application No. 12/347,785, filed on Dec. 31, 2008, now Pat. No. 8,400,268, which is a continuation-in-part of application No. 12/036,136, filed on Feb. 22, 2008, now Pat. No. 8,026,814, said application No. 12/347,785 is a continuation-in-part of application No. 12/178,480, filed on Jul. 23, 2008, now Pat. No. 8,373,562.

(60) Provisional application No. 60/961,894, filed on Jul. 25, 2007.

(51) Int. Cl.
*G08B 5/22* (2006.01)
*G08B 25/00* (2006.01)
*G08B 1/08* (2006.01)
*G08B 13/14* (2006.01)
*G08B 23/00* (2006.01)

(52) U.S. Cl.
USPC .................. 340/8.1; 340/539.12; 340/539.13; 340/572.1; 340/573.1

(58) Field of Classification Search
USPC .................................. 340/8.1, 539.12, 539.13
See application file for complete search history.

(56) References Cited

U.S. PATENT DOCUMENTS

| | | | |
|---|---|---|---|
| 5,387,993 A | 2/1995 | Heller et al. |
| 5,485,163 A | 1/1996 | Singer et al. |
| 5,602,744 A | 2/1997 | Meek et al. |
| 5,793,290 A | 8/1998 | Eagleson et al. |

(Continued)

OTHER PUBLICATIONS

Advisory Action for U.S. Appl. No. 12/178,480, mail date Mar. 7, 2012, 3 pages.

(Continued)

*Primary Examiner* — Daniel Wu
*Assistant Examiner* — Emily C Terrell
(74) *Attorney, Agent, or Firm* — Foley & Lardner LLP

(57) ABSTRACT

A system can be for use with a number of reference tags disposed at respective reference locations in a coverage area. The reference tags can be configured to form a wireless mesh network. A system can include a first tag configured to communicate with the reference tags. The first tag can operate in a sleep mode and includes a motion sensor. The first tag is woken out of the sleep mode on a first periodic basis to communicate with the reference tags. The first tag is woken out of the sleep mode at a second periodic basis in response to motion signal from the motion sensor. The second periodic basis is more frequent than the first periodic basis. The system can also include a positioning system configured to receive data related to the communication between the first tag and the reference tags. The positioning system can be configured to process the data to determine a location of the first tag.

20 Claims, 9 Drawing Sheets

(56) References Cited

U.S. PATENT DOCUMENTS

| | | | |
|---|---|---|---|
| 6,396,413 | B2 | 5/2002 | Hines et al. |
| 6,639,516 | B1 | 10/2003 | Copley |
| 6,661,335 | B1 | 12/2003 | Seal |
| 6,893,396 | B2 | 5/2005 | Schulze et al. |
| 6,998,985 | B2 | 2/2006 | Reisman et al. |
| 7,098,792 | B1 | 8/2006 | Ahlf et al. |
| 7,180,420 | B2 | 2/2007 | Maurer |
| 7,274,294 | B2 | 9/2007 | Heinze et al. |
| 7,295,115 | B2 | 11/2007 | Aljadeff et al. |
| 7,323,991 | B1 | 1/2008 | Eckert et al. |
| 7,365,645 | B2 | 4/2008 | Heinze et al. |
| 7,916,023 | B2 | 3/2011 | Rado |
| 8,345,652 | B2 * | 1/2013 | Banerjea et al. ............ 370/338 |
| 2002/0036569 | A1 | 3/2002 | Martin |
| 2003/0007473 | A1 | 1/2003 | Strong et al. |
| 2003/0048905 | A1 | 3/2003 | Gehring et al. |
| 2003/0146835 | A1 | 8/2003 | Carter |
| 2003/0204130 | A1 | 10/2003 | Colston et al. |
| 2003/0235172 | A1 | 12/2003 | Wood |
| 2004/0027244 | A9 | 2/2004 | Menard |
| 2004/0130446 | A1 | 7/2004 | Chen et al. |
| 2004/0169587 | A1 | 9/2004 | Washington |
| 2004/0169589 | A1 | 9/2004 | Lea et al. |
| 2005/0093709 | A1 | 5/2005 | Franco et al. |
| 2005/0264416 | A1 | 12/2005 | Maurer |
| 2006/0001539 | A1 * | 1/2006 | Adamczyk et al. ...... 340/539.18 |
| 2006/0009240 | A1 | 1/2006 | Katz |
| 2006/0125631 | A1 | 6/2006 | Sharony |
| 2006/0194587 | A1 | 8/2006 | Sharony et al. |
| 2007/0123597 | A1 | 5/2007 | Perry et al. |
| 2007/0132576 | A1 | 6/2007 | Kolavennu et al. |
| 2007/0132597 | A1 | 6/2007 | Rodgers |
| 2007/0135866 | A1 | 6/2007 | Baker et al. |
| 2007/0152811 | A1 | 7/2007 | Anderson |
| 2007/0192174 | A1 | 8/2007 | Bischoff |
| 2007/0247286 | A1 | 10/2007 | Drago et al. |
| 2007/0247366 | A1 | 10/2007 | Smith et al. |
| 2012/0002792 | A1 * | 1/2012 | Chang ........................... 379/40 |
| 2012/0052879 | A1 * | 3/2012 | Wildon et al. ............ 455/456.1 |
| 2013/0076523 | A1 * | 3/2013 | Kwan et al. ................ 340/686.6 |
| 2013/0141233 | A1 * | 6/2013 | Jacobs et al. ................ 340/521 |

OTHER PUBLICATIONS

Advisory Action for U.S. Appl. No. 12/347,785, mail date Mar. 14, 2012, 3 pages.
Amendment and Reply for U.S. Appl. No. 12/036,136, mail date Mar. 14, 2011, 9 pages.
Amendment and Reply for U.S. Appl. No. 12/178,480, mail date Feb. 27, 2012, 16 pages.
Amendment and Reply for U.S. Appl. No. 12/178,480, mail date Oct. 18, 2011, 15 pages.
Amendment and Reply for U.S. Appl. No. 12/347,785, mail date Feb. 29, 2012, 18 pages.
Amendment and Reply for U.S. Appl. No. 12/347,785, mail date Nov. 21, 2011, 17 pages.
Notice of Allowance for U.S. Appl. No. 12/036,136, mail date May 19, 2011, 8 pages.
Notice of Allowance for U.S. Appl. No. 12/178,480, mail date Oct. 1, 2012, 5 pages.
Notice of Allowance for U.S. Appl. No. 12/347,785, mail date Nov. 5, 2012, 10 pages.
Office Action for U.S. Appl. No. 12/036,136, mail date Dec. 14, 2010, 10 pages.
Office Action for U.S. Appl. No. 12/178,480, mail date Apr. 13, 2012, 33 pages.
Office Action for U.S. Appl. No. 12/178,480, mail date Dec. 27, 2011, 27 pages.
Office Action for U.S. Appl. No. 12/178,480, mail date Jul. 15, 2011, 23 pages.
Office Action for U.S. Appl. No. 12/347,785, mail date Aug. 30, 2011, 17 pages.
Office Action for U.S. Appl. No. 12/347,785, mail date Jun. 4, 2012, 22 pages.
Office Action for U.S. Appl. No. 12/347,785, mail date Dec. 30, 2011, 20 pages.
Petition Decision for U.S. Appl. No. 12/178,480, mail date Feb. 26, 2009, 3 pages.
Petition for Review for U.S. Appl. No. 12/178,480 mail date Feb. 22, 2009, 88 pages.
Request for Continued Examination for U.S. Appl. No. 12/178,480, mail date Mar. 27, 2012, 4 pages.
Request for Continued Examination for U.S. Appl. No. 12/347,785, mail date Mar. 27, 2012, 4 pages.

* cited by examiner

END TO END EMERGENCY RESPONSE

CROSS-REFERENCE TO RELATED PATENT APPLICATIONS

This application is a continuation of U.S. application Ser. No. 12/347,785, filed Dec. 31, 2008, incorporated herein by reference in its entirety, which is a continuation-in-part of U.S. application Ser. No. 12/178,480, filed Jul. 23, 2008, incorporated herein by reference in its entirety, which claims priority from U.S. Provisional Application Ser. No. 60/961,894, filed Jul. 25, 2007, incorporated herein by reference in its entirety, and which is also a continuation-in-part of U.S. application Ser. No. 12/036,136, filed Feb. 22, 2008, incorporated herein by reference in its entirety, which claims priority from U.S. Provisional Application Ser. No. 60/961,894, filed Jul. 25, 2007, incorporated herein by reference in its entirety.

BACKGROUND

The present application relates generally to a locator system. More particularly, the present application relates to an emergency response locator system utilizing radio frequency tags.

Locator systems can be utilized for asset and personnel tracking. Locator systems are described in U.S. Pat. No. 7,274,294, filed Jan. 26, 2005, entitled "MOBILE LOCATOR SYSTEM AND METHOD" by Heinze et al. and U.S. Pat. No. 7,365,645, filed Mar. 17, 2006, entitled "MOBILE LOCATOR SYSTEM AND METHOD WITH WANDER MANAGEMENT" by Heinze et al. both of which are assigned to the assignee of the present application and incorporated herein by reference in their entireties.

Generally, a locator system may comprise a dedicated handheld transceiver specifically designed to display data, execute software and provide RF signals that wirelessly poll the RF tags. The handheld transceiver includes a memory to store data received from the RF tags. Dedicated handheld units are expensive because they require a user interface, a power supply, a memory, a processor, and RF circuitry.

The RF tags typically include a transceiver and a memory powered by a battery. The memory of the RF tags are preprogrammed with a specific address or identification number. The RF tags may be carried by personnel, affixed to the outside of an item or integrated within the equipment that is to be tracked or located.

To locate an asset or personnel, the handheld transceiver provides an interrogation signal. All RF tags within the range of the interrogation signal respond to the interrogation signal and provide a signal containing the identification of the RF tag to the handheld transceiver.

Although conventional handheld locator systems provide an indication that the asset is within range of the interrogation signal, locator systems have not been utilized in emergency response situations to precisely locate the person in need of assistance. Thus, there is a need for an emergency response locator system configured to more precisely locate a person in need of assistance.

SUMMARY

One embodiment of the application relates to a system comprising a plurality of reference tags affixed to reference locations in a coverage area and configured to form a wireless mesh network. The system also includes a call tag configured to communicate with the plurality of reference tags and to collect data regarding the communication with the plurality of reference tags. The call tag is configured to send a first signal in response to an event. A positioning system is coupled to the wireless mesh network and configured to receive the first signal and the data collected by the call tag. The positioning system is further configured to process the data collected by the call tag to determine the call tag location with respect to the plurality of reference tags. A portable electronic device is configured to communicate with the wireless mesh network and configured to receive the call tag location from the positioning system.

A second embodiment of the application relates to a system comprising a plurality of reference tags affixed to reference locations in a coverage area and configured to form a wireless mesh network. The system further includes a call tag configured to communicate with the plurality of reference tags and to collect data regarding the communication with the plurality of reference tags. The call tag is further configured to send a first signal in response to an event.

A third embodiment of the application relates to a method for providing a wireless emergency response network. The method comprises positioning a plurality of reference tags in a coverage area. The reference tags are configured to communicate with one another and a plurality of call tags that enter the coverage area. The method also includes coupling a first reference tag of the plurality of reference tags to a local area network. The first reference tags is configured to communicate data from the plurality of reference tags and the plurality of call tags that enter the coverage area to the local area network. The method further includes determining the location of each of the plurality of reference tags in the coverage area and storing the location of each of the plurality of reference tags in a memory coupled to the local area network.

A fourth embodiment of the application relates to a method for determining the location of a call tag in a wireless emergency response network. The method comprises receiving a first signal at a plurality of reference tags from a call tag. The plurality of reference are disposed in coverage area. The method also includes sending response signals from the plurality of reference tags to the call tag and providing a second signal from the call tag to a positioning service via a network. The second signal includes data based on the response signals from the plurality of reference tags. The positioning service and the plurality of reference tags are coupled to the network and the positioning service is configured to determine the location of the call tag in the coverage area based on the second signal.

A fifth embodiment of the application relates to a system can be for use with a number of reference tags disposed at respective reference locations in a coverage area and configured to form a wireless mesh network. The system can include a first tag configured to communicate with the reference tags. The first tag can operate in a sleep mode and includes a motion sensor. The first tag is woken out of the sleep mode on a first periodic basis to communicate with the reference tags. The first tag is woken out of the sleep mode at a second periodic basis in response to motion signal from the motion sensor. The second periodic basis is more frequent than the first periodic basis. The system can also include a positioning system configured to receive data related to the communication between the first tag and the reference tags. The positioning system can be configured to process the data to determine a location of the first tag.

A sixth embodiment of the application relates to a tag unit for use with reference tags disposed at reference locations in a coverage area and configured to form a wireless mesh network. The tag unit includes a processor configured to communicate with the reference tags and to collect data regarding communication with the reference tags, and a motion sensor. The tag unit operates in a sleep mode. The tag unit is woken out of the sleep mode on a first periodic basis to communicate with the reference tags and is woken out of the sleep mode at a second periodic basis and response to a motion signal from the motion sensor. The second periodic basis is more frequent than the first periodic basis.

A seventh embodiment of the application relates to a method of determining a location of a tag unit in a wireless emergency response network. The method includes waking the tag unit from a sleep mode on a first periodic basis to communicate with reference tags. The method also includes waking the tag unit from the sleep mode at a second periodic basis in response to a motion signal from a motion sensor. The second periodic basis is more frequent than the first periodic basis. The reference tags can be disposed in a coverage area. The method also includes determining the location of the tag unit in the coverage area based on data associated with communication between the tag unit and the reference tags.

An eight embodiment of the application relates to a system for use with a number of reference tags disposed at respective reference locations in a coverage area and configured to form a wireless mesh network. A system can include a first tag configured to communicate with the reference tags. The first tag can operate in a sleep mode and includes a motion sensor. The first tag is woken out of the sleep mode on a first periodic basis to communicate with the reference tags. The first tag is woken out of the sleep mode at a second periodic basis in response to motion signal from the motion sensor. The second periodic basis is more frequent than the first periodic basis. The system can also include a positioning system configured to receive data related to the communication between the first tag and the reference tags. The positioning system can be configured to process the data to determine a location of the first tag.

DETAILED DESCRIPTION OF THE PREFERRED EMBODIMENTS

Figure 1:
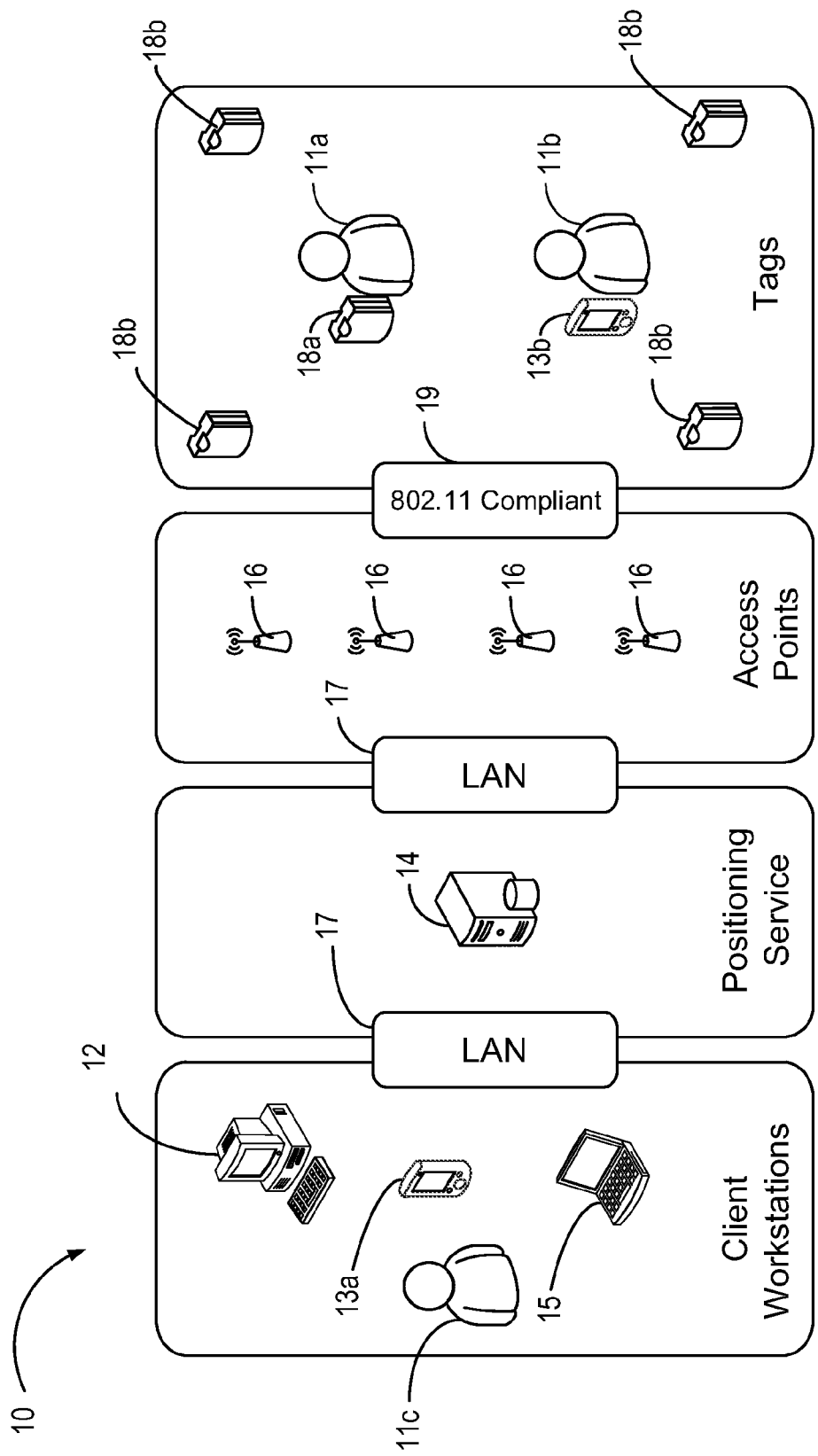
FIG. 1 is a general block diagram of an emergency response locator system according to an exemplary embodiment.

Referring to FIG. 1, an end-to-end emergency response locator system 10 is illustrated according to an exemplary embodiment. Emergency response locator system 10 can be used to provide assistance to distressed persons 11a in the event of an emergency by tracking and locating call tag 18a carried by distressed person 11a. Emergency response locator system 10 may be configured to use IEEE 802.11 wireless networking standard. Employing this standard, advantageously allows emergency response locator system 10 to utilize an existing wireless infrastructure 19, however, other wireless standards could be employed without departing from the scope of the application.

Generally, emergency response locator system 10 includes a plurality of reference tags 18b, one or more call tags, a positioning system (e.g., positioning service 14) and one or more portable electronic devices. The plurality of reference tags 18b are affixed to reference locations in a coverage area and configured to communicate with one another to form a wireless mesh network. The one or more call tags 18a are configured to communicate with the plurality of reference tags 18b and to collect data regarding the communication with the plurality of reference tags 18b. The call tag is further configured to send a signal to a positioning service in response to an event. The positioning service is coupled to the wireless mesh network and configured to receive the signal from call tag 18a. The signal may be transmitted over a network, such as a LAN, to which the positioning system and the wireless mesh network are both coupled. The signal from the call tag may contain the data collected by call tag 18a or the data collect may be sent in a separate signal. The positioning system is configured to process the data collected by call tag 18a to determine the location of call tag 18a in the coverage area with respect to the plurality of reference tags.

Emergency response locator system 10 may also include one or more standard networking devices, such as access point 16. Access points 16 may be configured broadcast wireless signals using an 802.11 wireless standard 19, that can be received by tag units 18a-b and portable electronic devices, such as mobile devices 13a-b (e.g., mobile phone, PDA).

Access point 16 may serve to couple the wireless mesh network to a network, such as local area network (LAN) 17, or any other type of network, for communication with the positioning system (e.g., positioning service 14). Furthermore, access point may serve to couple the wireless mesh network to the Internet or other types of wide area networks for communicating with a remote positioning system. Emergency response locator system 10 may also be configured to use access point 16 like a reference tag. For example, call tag 18*a* may be configured to communicate with access point 16 and to collect data regarding the communication with access point 16 and provide the data to the positioning system to assist in locating the call tag 18*a* in the coverage area. In this example, the location of access point 16, with respect to the coverage area, including the other reference tags 18*b*, is known by the positioning system.

Call tag unit 18*a* may be configured to measure and/or collect relative signal strengths of signals from reference tags 18*b* and access points 16. These signals may be transmitted from reference tags 18*b* and access points 16 in response to a broadcasted probe signals from call tag 18*a*. Alternatively, reference tags 18*a* and/or access point 16 may be configured to periodically transmit a signal. The period between transmissions may be dependent on the call tag 18*a*. For example, if an event occurs (e.g., an emergency situation indicated by call tag 18*a*), then the reference tags 18*b* may be configure to transmit at a faster rate in order to provide more accurate location information. This may be especially important if the distressed person 11*a* carrying the call tag 18*a* is moving (e.g., running). Call tag collects the data from the signals transmitted from reference tags 18*b* and access points 16, such as signal strength information, and communicates the collected signal strengths to a processing system, such as a server hosting positioning service 14 through local area network (LAN) 17. Position service 14 may be located on site or may be located remotely with respect to the coverage area. Positioning service 14 may be a PC, laptop or server, that includes one or more software suites and serves as a positioning/location engine for tag units 18*a-b*, mobile devices 13*b* and transmitting points.

Positioning service 14 acts as a location engine and determines the location of tag units 18*a-b* and mobile devices 13*b* based on calibration data collected during initial installation (e.g., location of reference tags 18*b* on coverage area floor plan or map), historical movements of call tag 18*a*, and statistical analysis. The location of call tag 18*a* of distressed person 11*a* is published to end user applications on workstation(s) 12, laptop(s) 15 and/or mobile device(s) 13*a*. The location of call tag 18*a* of distressed person 11*a* is also published to emergency responder 11*b* via mobile device 13*b*. The location of call tag 18*a* of distressed person 11*a* is also preserved in a database for future reporting and analysis. Users 11*b-c* can view the location data on end-user devices, such as workstation 12, mobile devices 13*a-b*, and laptops 15. In an alternative embodiment, tag unit 18*a-b* may be configured to perform the analysis of the positioning service 14 as described below and act as a self locating location engine. The location, as determined by tag unit 18*a-b*, is delivered to an emergency responder 11*b* via mobile device 13*b* and to a database for reporting and analysis and published to end user applications on workstation(s) 12, laptop(s) 15 and/or mobile device(s) 13*a*.

In an exemplary embodiment, as illustrated in FIG. 1 emergency response locator system 10 comprises positioning service 14, which receives data associated with signal strengths between wireless access points 16, reference tags 18*b* and call tag 18*a*. Positioning service 14 analyzes the data associated with a number of transmitting access points 16 and reference tags 18*b* and determines the locations of call tag 18*a*. Positioning service 14 determines the location of call tag 18*a* based on the following: calibration data collected during initial installation; historical movements of call tag 18*a*; and statistical analysis, or any combination thereof. Furthermore, positioning service 14 does not necessarily need to use calibration data collected during installation for calculating locations, instead, it can make use of the dynamic sample points from each reference point (e.g., transmitting points and tag units) to perform location calculations.

In an exemplary embodiment, reference tags 18*b* may be configured in various arrangements to form wireless mesh networks that communicate with a processing station, such as positioning service 14, via a network connection for determining the location of anyone of the tags. Call tag 18*a* operates by collecting information about its surroundings and conveys this information to another device capable of determining the location of call tag 18*a* based on the collected information. For example, call tag 18*a* sends probe request messages to wireless access point 16 and reference tag 18*b*. Reference tags 18*b* and AP 16 respond with probe response messages from which call tag 18*a* determines the received signal strength indication (RSSI) of each response signal. Call tag 18*a* collects the RSSI information and communicates the information to either AP 16 or reference tag 18*b*. The information is communicated to a processing station, such as positioning service 14, that is capable of determining the location of call tag 18*a* from the collected data. In addition, reference tag 18*b* can send a special message to tag units 18*a-b* at a pre-configured time interval. Reference tags 18*b* synchronize with each other in order to send their messages at approximately the same time. Call tag 18*a* wakes to listen for messages from all reference tags 18*b*. Under this scenario, call tag 18*a* does not need to send a probe request message to reference tag 18*b*. However, a probe request message may be needed when communicating with AP 16.

In addition to, or in place of, RSSI information, call tag 18*a* may be configured to collect, use and send time of flight (TOF) information to facilitate location of call tag 18*a*. In order to eliminate reflections and other multipath issues, reference tags 18*b* and call tag 18*a* can determine a rudimentary TOF for each message sent. The message with the lowest TOF is likely the most direct path between reference tag 18*b* and call tag 18*a*. To calculate the TOF, reference tag 18*b* timestamps its message with an incremented value. Call tag 18*a* timestamps the message with its own incremented value when the message is received. Call tag 18*a*, or positioning service 14, looks at the difference between each of the time stamps of the messages received from reference tag 18*b* and determines which spent the least amount of time traveling to call tag 18*a*. RSSI information may be used in conjunction with TOF information to determine the location of call tag 18*a* in the coverage area. The location of mobile device 13*a-b* may be determined in the same fashion as call tag 18*a*, when the emergency responder 11*b* is moving through the coverage area to locate call tag 18*a* carried by distressed person 11*a*.

Call tag 18*a* and reference tag 18*b* ideally use the same circuit board and firmware to create a tag that can be tracked, serve as a fixed reference and act as a gateway/interface to a network, such as LAN 17 or a WLAN. Reference tags 18*b* are configured to communicate with one another to form a wireless mesh network. Reference tag 18*b* is configured to act as a signal source, call tag 18*a* collects the signals from reference tag 18*b* and the collected signals are sent, via the wireless network to a positioning service 14 to analyze the signals from reference tags 18b to determine the position of call tag 18a.

Reference tag 18b may be configured with the additional feature of providing a transport mechanism for delivering the collected packets of information to another medium, such as Ethernet. Reference tags 18b can communicate with one another to form a wireless mesh network. Call tag 18a collects and sends packets of information to reference tag 18b, which repeats the information packets to another reference tag 18b until it is finally delivered to another support media. Reference tags 18b can be used in lieu of a wireless communications network. If no network is installed, the reference tags 18b can be used to send information packets from call tag 18a to positioning service 14. This deployment model allows locating call tags 18a carried by distressed persons 11a in areas that do not have a wireless communications infrastructure.

Furthermore, many existing 802.11 networks 19 may not have adequate AP 16 locations or coverage to obtain the desired location accuracy. Reference tags 18b are used to improve positioning performance by increasing coverage density and to extend the communication coverage tag unit 18 where existing wireless coverage is intermittent, inadequate, or non-existent. Reference tag 18b can be configured to broadcast 802.11 compliant beacons to be used by tag units 18a-b to improve performance by providing additional RSSI measurements. Alternatively, reference tag 18b can also be configured to transmit other types of beacons. In addition, reference tag 18b can send a special message to tag units 18a-b at a pre-configured time interval. Reference tags 18b synchronize with each other in order to send their messages at approximately the same time. Call tag 18a wakes to listen for messages from all reference tags 18b. Under this scenario, call tag 18a does not need to send a probe request message to reference tag 18b. However, a probe request message may be needed when communicating with AP 16.

Reference tag 18b can also connect as a client to an existing 802.11 wireless network to provide a wireless backhaul to an existing 802.11 network when a wired Ethernet connection is not needed. Reference tag 18b is not a fully functional 802.11 access point 16 in that it does not allow other 802.11 devices to associate. Consequently, reference tag 18b does not relay any data or communications other than tag units 18a-b information. Reference tag 18b monitors for tag units 18a-b association requests when not transmitting to look for tag units 18a-b position updates. Reference tag 18b sends out an association response, which notifies tag units 18a-b of the association ID and returns back to receive mode to collect the new tag units 18a-b position update.

In an exemplary embodiment, implementing Circular Polarized (CP) antennas in the reference tag 18b provides significant improvements in RSSI stability in harsh environments. RSSI values can change significantly due to multipath, orientation, polarization, fading, and other environmental factors. Signals from linear polarized antennas can vary significantly due to the factors listed above.

In an exemplary embodiment, reference tag 18b determines delivery location of the packet to positioning service 14 by performing an address resolution protocol (ARP) frame with the server's destination IP address and a broadcast media access control (MAC) address. A switch forwards this broadcast to all ports, including one attached to a router. A router, recognizing that it can reach the server's network, will send an ARP response frame with its own MAC address as a destination MAC address that reference tag 18b can use. Association with reference tag 18b is not necessary because the organizational unique identifier (OUI) at the header of the MAC address distinguishes it from the AP 16.

Various configurations are possible, some of which do not require AP 16. Reference tag 18b may use any type of network protocol or network technology, wired or wireless, to communicate with positioning service 14. Reference tag 18b may be configured to communicate using generic packet radio service (GPRS), worldwide interoperability for microwave access (WiMAX) or any other wide area network (WAN). Reference tag 18b may also be configured to communicate with the processing station using a radio access network (RAN).

Figure 2:
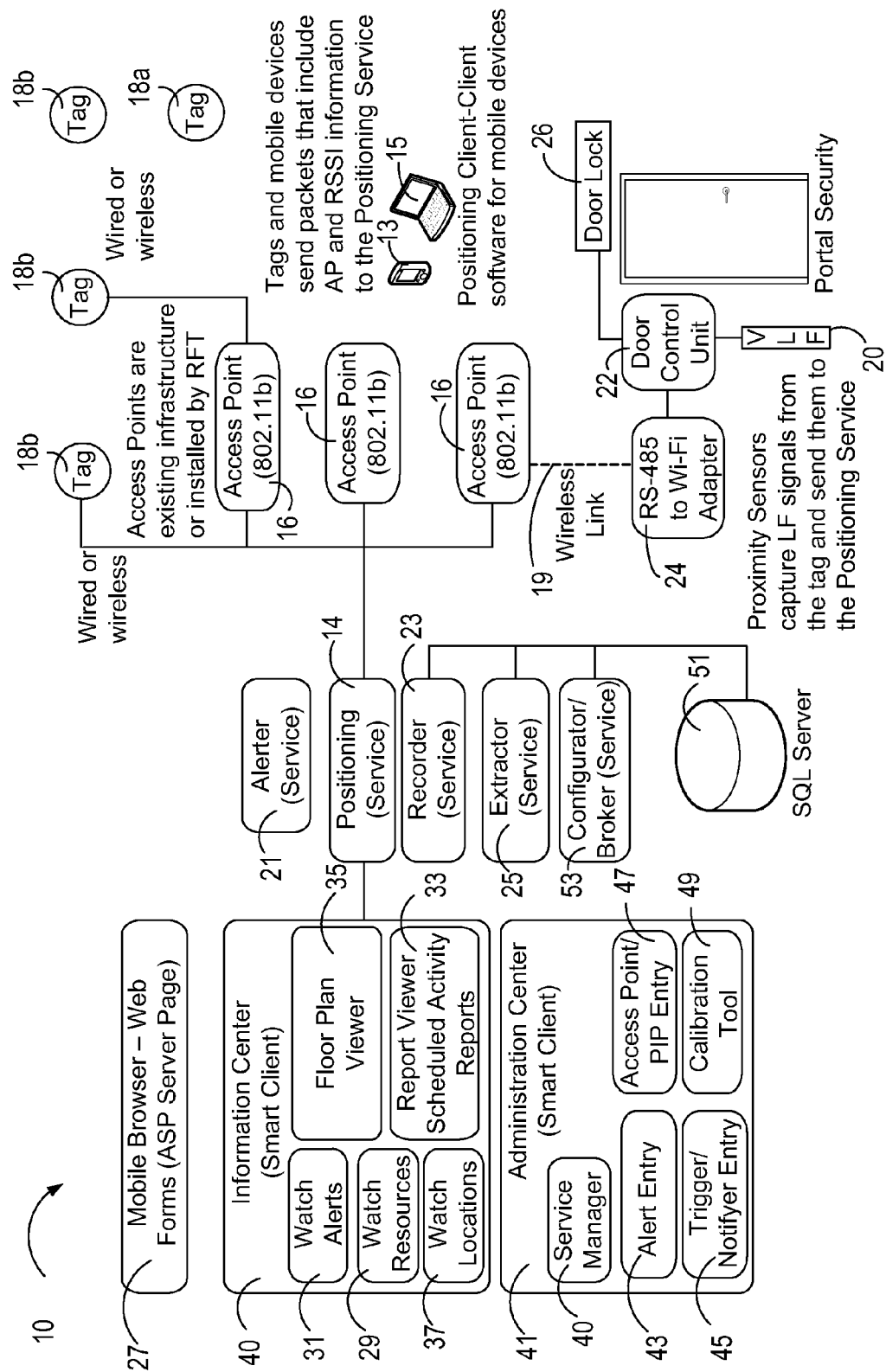
FIG. 2 is a block diagram of an overview of an emergency response locator system according to another exemplary embodiment.

In an exemplary embodiment, as illustrated in FIG. 2, positioning service 14 contains algorithms that determine the position of tag units 18a-b. Positioning service 14 receives messages from tag units 18a-b containing the RSSI values of the AP 16 in an area. Higher RSSI values correspond to stronger signals. Statistical and heuristic algorithms are applied to data and a position of tag units 18a-b is determined and published to user 11. Algorithm concepts that are included in an analysis can be the following or any combination thereof: histograms; static analysis; vector analysis; and geometric center analysis. Alternatively, tag units 18a-b is configured to apply algorithms to determine its own position (e.g., self locate). In one embodiment, tag units 18a-b transmits its location, which is eventually delivered to one or more of: positioning service 14, alerter service 21, recorder service 23, extractor service 25, configurator service 53 and SQL server 51. Once the one or more services are performed, the location of tag units 18a-b is delivered to information center 40. Alternatively, the location of tag unit 18 may bypass the various services and be delivered directly to information center 40.

In an exemplary embodiment, alerter service 21 can receive location messages from positioning service 14 and analyze them against alert rules. The rules can be defined, stating when an alert should occur, based on tag units 18a-b and location combinations. Rules can be created using administrator center 41.

In an exemplary embodiment, recorder service 23 can subscribe to alerter service 21 and positioning service 14. Recorder service 23 can save changes in data received to an SQL server 51. Data can only be recorded when changes occur.

In an exemplary embodiment, configurator service 53 can provide services, hardware, and applications with necessary configuration information stored in a central database. Configurator service 53 can create initial communication settings to allow services and clients to communicate. Configurator service 53 can also allow scalability for emergency response locator system 10 by brokering information requests. Configurator service 53 can also provide interfaces for connecting to a database and retrieving information.

In an exemplary embodiment, extractor service 25 can be queried to retrieve data recorded by recorder service 23. Data can be used by information center 40 and PC/Mobile Web-Forms 27 to provide tracking functions and generate custom reports.

In an exemplary embodiment, information center 40 is a user interface for emergency response locator system 10. Information center 40 can watch resources 29, watch alerts 31, view reports, 33, create utilization charts, view floor plans, 35, and monitor real-time data pertaining locations 37.

In an exemplary embodiment, administrator center 41, can be a primary user interface for configuring data into emergency response locator system 10. Administrator center 41 consists of several modules that allow users tag unit entry 39, alert entry 43, trigger entry 45, resource entry, location entry, access point entry 47, etc. Administrator center can also be a primary tool used for calibration 49.

Information center 40 and positioning service 14 may be incorporated into one station, such as a PC or server, or a configuration of multiple PCs or servers. The station incorporating information center 40 and positioning service 14 may be remotely located with respect to the coverage area or may be on site. Information center 40 and positioning service 14 may be separate stations and either one may be remotely located with respect to the coverage area or located on site. The other services (e.g., alerter service 21, recorder service 23, extractor service 25, and configurator service 53) and SQL server 51 may be incorporated into a single station with the information center 40 or may form one or more stations at one or more locations in various configurations.

Figure 3C:
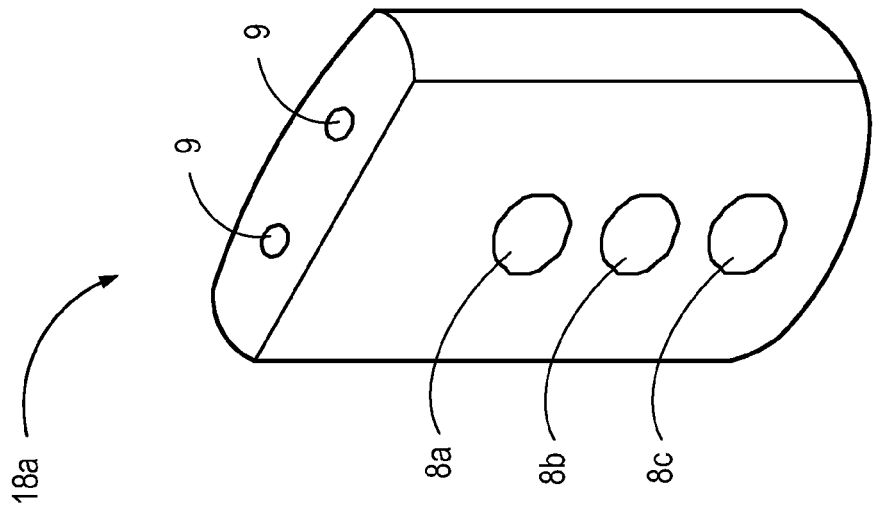
FIG. 3C is a perspective view drawing of a call tag for use in the system illustrated in FIGS. 1 and 2 in accordance with another exemplary embodiment.
Figure 3B:
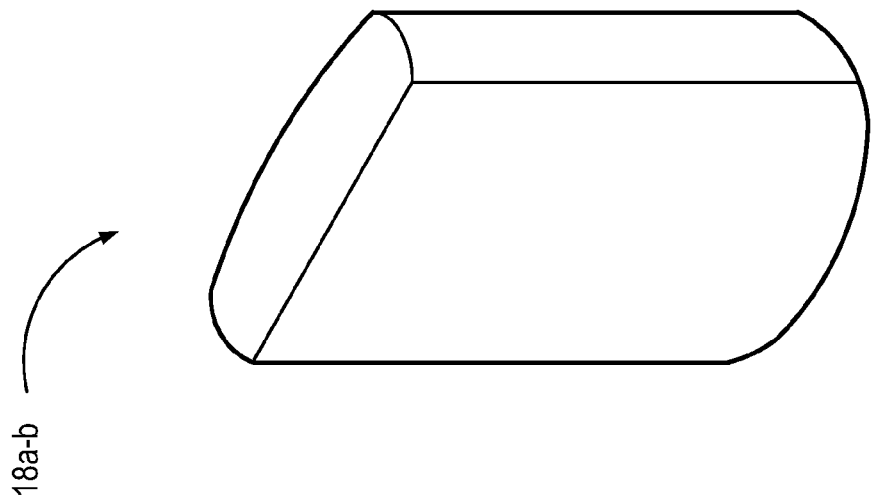
FIG. 3B is a perspective view drawing of a tag unit for use in the system illustrated in FIGS. 1 and 2 in accordance with another exemplary embodiment.
Figure 3A:
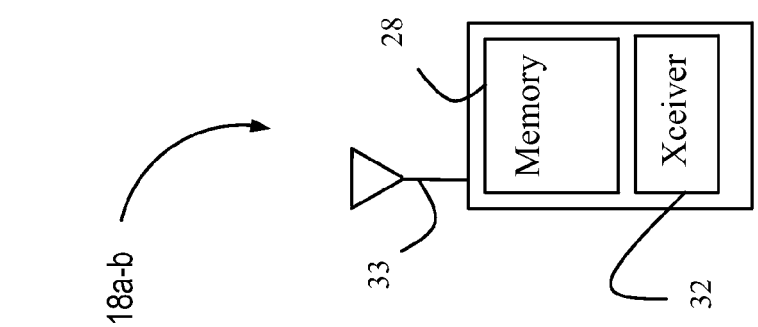
FIG. 3A is a block diagram of a tag unit for use in the system illustrated in FIGS. 1 and 2 in accordance with another exemplary embodiment.

With reference to FIG. 3A-C, tag units 18a-b can be SEEKER™ tags manufactured by RF Technologies, Inc. that operate in accordance with at least one of the operations described below.

Each of tag units 18a-b is preferably a complete, self-powered electronic assembly including an RF printed circuit board, transceiver chipset, microstrip antenna for transmit and receive, and lithium coin cell battery, sealed in a plastic housing. An antenna 33 can be internal or external to the housing. Tag units 18a-b can be implemented in a variety forms. Units 18a-b can be transponder-based tags.

Memory 28 can be any form of data storage including an EEPROM. Memory 28 can be programmed at manufacture or installation. Alternatively, memory 28 can be programmed by providing data from mobile device 13b to tag units 18a-b.

Tag units 18a-b preferably include low battery detection functionality. When one of tag units 18a-b is polled, it responds with its unique ID and a status byte indicating its battery condition. If one of units 18a-b is instructed to beep during the poll, it will may be configured to make an audible sound allowing users to gain a rough indication of where the tag is located. Tag units 18a-b may be configured with an on-board motion detector and low power management system to extend or maximize battery life. Should tag units 18a-b become stationary, the battery powers down, hence extending battery life. Tag units 18a-b can transmit low-battery alerts when replacement is eminent.

Additionally, reference tags 18b can also synchronize with each other and call tag 18a to conserve battery life. In one embodiment, the first reference tag to be activated may send a pulse signal on a periodic interval. Other reference tags 18b that become active will detect the pulse and begin sending their signals just slightly offset from the pulse. When call tag 18a wakes up, it waits for a signal and then stays awake just long enough to receive all the signals from the reference tags. Call tag 18a may be configured to then awake at the same periodic interval as the reference tags 18b, thereby maximizing it sleeping time and conserving battery life. In one embodiment, call tag transmits a signal and then stays awake just long enough to receive all the signals from the reference tags 18b.

In an exemplary embodiment, tag units 18a-b are software configurable so that any single tag unit may be configured or reconfigured to act as either a call tag, an asset tag or a reference tag. Software configurable tag units 18a-b provide maximum flexibility for adapting to new coverage areas and new coverage area configurations.

Tag units 18a-b is are configured to collect probe responses from transmitting points, such as standard wireless access points (AP) 16 and other tag units. When one of tag units 18a-b is configured to perform the functions of an call tag 18a, it may be provided to various persons for real-time tracking and locating in the event of an emergency. Tag unit 18a-b may be configured to be compatible with IEEE 802.11 wireless communication systems and designed for minimal bandwidth, enabling user 11 to utilize existing wireless local area network (WLAN) infrastructure 19. Tag units 18a-b may be capable of both high frequency (2.4 GHz) and low frequency (262 kHz) transmission. Tag units 18a-b may be managed through a mobile management resource management software. Units 18a-b can have dimensions of 1.9"× 1.38"×0.7" with a weight of less than one ounce. Tag units 18a-b comprises a welded waterproof, chemical-proof case and may be mounted to an asset or a fixed reference location by adhesive, tie wrap, lanyard, or clip. Tag units 18a-b withstand temperatures from 0 to 120 degrees Fahrenheit and non-condensing humidity from 0 to 95%. Battery Life is typically 2-3 years (depending on how often it is polled). However, all tags do not necessarily have to come in the same physical form factor. Various tag units 18a-b may be different shapes, sizes and enclosures and they may be powered externally or battery powered. Tag units 18a-b may accept different battery types, or be rechargeable and have a docking station designed for battery recharging. Units 18a-b preferably have a range of 200-300 feet. Tag units 18a-b may receive FSK transmissions at 433.92 MHz, a WiFi signal or any other type of wireless signal (the interrogation signal) from mobile device 13a-b in the form of a poll.

In an exemplary embodiment, tag units 18a-b include a tamper detection security feature, tamper contacts, that prevents theft and loss of equipment by causing an alert when tag units 18a-b are removed from an asset or other fixed location (depending on the tag type). The contacts are connected to an adhesive pad that is used to attach tag units 18a-b to the asset or fixed location. When tag units 18a-b are removed from the asset or fixed location, the contacts in the adhesive pad break and come free from tag units 18a-b and a tamper is detected. U.S. Pat. No. 7,098,792 assigned to the assignee of the present application is herein incorporated in its entirety by reference and discloses tamper proof features.

Tag units 18a-b wake up periodically and look to receive the preamble of the interrogation signal from mobile device 13a-b. Each unit of units 18a-b that sees the poll in the area of mobile device 13a-b stays awake while watching for the Start Of Frame (SOF) and following data. The following data can include the department ID number for a group poll or the specific tag ID number for a tag specific poll. In a group poll (e.g., department poll), each of units 18a-b replies in its associated time slot based on the tag ID number of units 18a-b upon receiving the End Of Frame (EOF). Preferably, in a group poll (department) or tag specific poll, only units 18a-b from the selected group or the specifically selected units 18a-b respond. Tag units 18a-b are programmed to review the additional data for specific tag identification numbers or group identification numbers and respond only when those numbers match tag units 18a-b. If doing a tag specific poll, the tag being polled immediately replies upon seeing the EOF and valid checksum.

Although five tag units 18a-b are shown in FIG. 1, any number of tag units 18a-b can be utilized in system 10 without departing from the present application. In an exemplary embodiment, mobile device 13a-b provides an interrogation signal to units 18a-b, and units 18a-b respond to the interrogation signal by providing a tag identification to the mobile device 13a-b.

Units 18a-b can also respond to the interrogation signal with an indication of the received signal strength indication (RSSI). The indication is for the signal received by mobile device 13b from tag units 18a-b. The RSSI can be displayed on mobile device 13b. The RSSI provides a rough indication of the proximity of mobile device 13b to the responding unit of tag units 18a-b.

In an exemplary embodiment, call tag 18a includes at least one call button that may be pressed by distressed person 11a in the event of an emergency. When the call button is pressed an alert signal is communicated to positioning service 14 and the location of call tag 18a is determined. The location of call tag 18a and the alert signal are delivered to a database for reporting and analysis and published to end user applications. End user 11c may use end user applications on client workstations 12, laptops 15 and mobile devices 13a to manage the response to the alert signal. For example, end user 11c may provide the alert and call tag 18a location to emergency responder 11b and request that emergency responder 11b locate and assist distressed person 11a. Emergency responder 11b may provide an acknowledgment signal to end user 11c using mobile device 13b so that end user 11c is assured that the situation is being addressed.

Alternatively, the emergency response system may be configured to automatically notify emergency responder 11b with the alert and location information from positioning service 14 without end user 11c intervention. Emergency response locator system 10 may be further configured to automatically notify all qualified emergency responders 11b within a predetermined proximity of distressed person 11a. If no emergency responders are within the predetermined proximity, then the proximity from distressed person 11a may be increased until an emergency responder 11b is found.

With reference to FIG. 3C, in an exemplary embodiment, call tag 18a may include multiple buttons for requesting different types of assistance corresponding to different types of emergencies. For example, one call button may be configured as personal crisis button 8a, which would be used in situations where distressed person 11a needs security assistance (e.g., notifying security that a car is being broken into in the parking garage). When this button is pressed the appropriate security and/or law enforcement personnel are provided with the alert and location of call tag 18a. A second call button may be configured as medical crisis button 8b, which would be used in situations where distressed person 11a is in need of medical assistance (e.g., experiencing severe chest pains in parking garage, injured after a fall and unable to get up). Call tag 18a may also include one or more LEDs 9 that blink to indicate to distressed person 11a that the alert has been received and that help is on the way. Other types of display configurations may be provided on the call tag 18a, such as an LCD display, an OLED display, LED display, electroluminescent displays (ELD), etc. A third call button may be configured as a panic button 8c. Alternatively, a panic signal may be generated by holding buttons 8a and/or 8b for a predetermined period of time (e.g., hold down for 3 seconds). Panic button may be configured to notify all types of emergency responders.

Once an alert of panic signal is generated, call tag 18a may be configured to enter into an alert mode (as described in U.S. Pat. No. 7,274,294 as SEEKER mode). In alert mode, call tag 18a attempts to communicate with mobile device 13b directly or through an ad hoc network configuration. Call tag 18a may be configured to remain in alert mode until the alert or panic signal is deactivated by emergency responder 11b using mobile device 13b. The alert or panic signal may be deactivated automatically when mobile device 13b is within a predetermined proximity (e.g. five feet) of call tag 18a, or emergency responder 11b may be required to deactivate the alert or panic signal via the user interface of mobile device 13b. One of the advantages of alert mode is that it allows call tag 18a to communicate directly with mobile device 13b when mobile device 13b is within a certain range of call tag 18a, even if there is no supporting wireless infrastructure (e.g., no reference tags 18b or access points 16). This is particularly helpful when there are holes in the wireless coverage area, or when the distressed person 11a is moving (e.g., running). In addition to the call tag configuration described above, call tag 18a may be a mobile device, such as a PDA or a mobile phone and loaded with firmware and software needed to perform the functions described above.

Figure 4B:
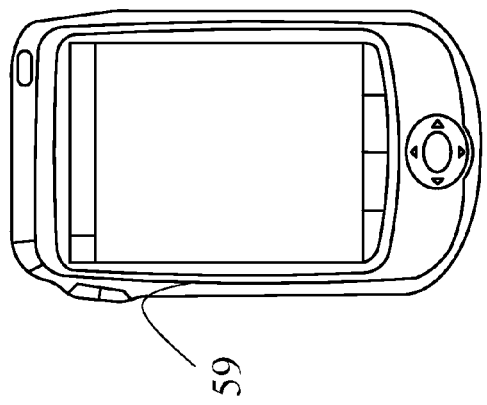
FIG. 4B is a top view general drawing of a mobile device (e.g., handheld computer) for use in the system illustrated in FIGS. 1 and 2 in accordance with another exemplary embodiment.
Figure 4C:
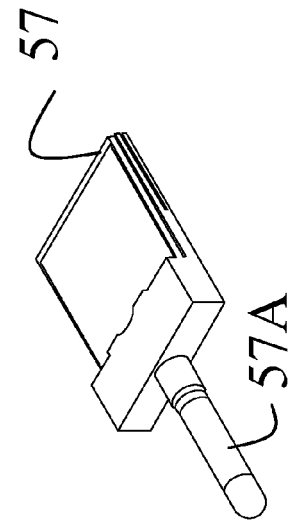
FIG. 4C is a perspective view schematic drawing of an RF module to use in the system illustrated in FIGS. 1 and 2 in accordance with another exemplary embodiment.
Figure 4A:
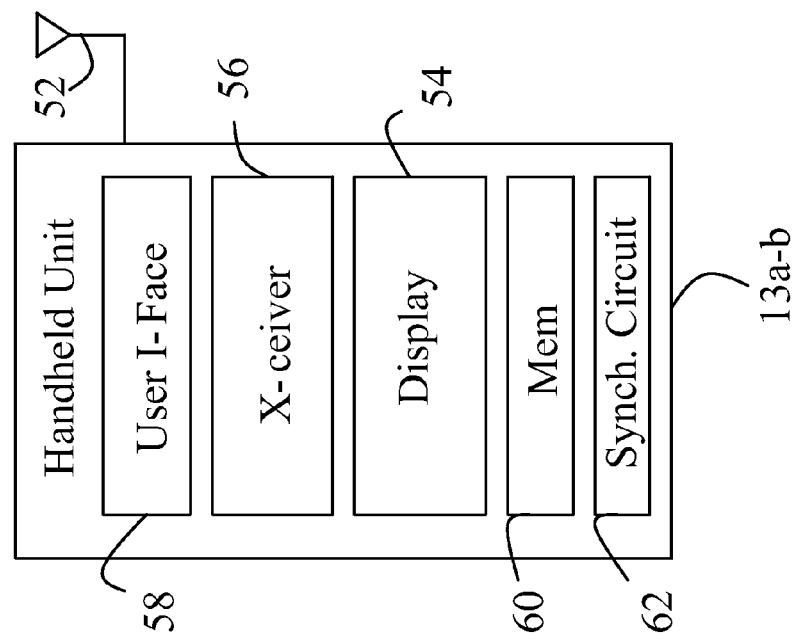
FIG. 4A is a block diagram of a mobile device for use in the system illustrated in FIGS. 1 and 2 in accordance with another exemplary embodiment.

With respect to FIG. 4A, mobile device 13a-b includes a display 54, transceiver 56, a user interface 58, a memory 60 and a synchronization circuit 62. Mobile device 13a-b can be embodied as a dedicated unit fabricated from ASICs, hardwired circuits, microprocessor-based control circuits configured by software, or other means for implementing at least one operation described below. Synchronization circuit 62 allows unit 13a-b to communicate with another computer systems and to exchange data with other databases remote from unit 13a-b.

Transceiver 56 can include an antennae 52. Transceiver 56 preferably includes receiver circuitry and a microcontroller for decoding protocol to derive tag identification number, signal strength, and status of the tag.

Antennae 52 can be a whip antenna or a directional antenna. Antennae 52 allows a user to determine the direction and relative distance to RF tag units 18a-b by pointing antenna 52 and monitoring the received signal strength from tag units 18a-b.

The information decoded by the microcontroller on module 57 is provided to mobile device 13a-b through the compact flash connector bus. Advantageously a driver is not required because the compact flash UART within module 57 communicates as a stream interface device. Data from module 57 is accessed as if it were a communication port.

Transceiver 56 may be configured to operate at 433 megahertz bands in a true ultra-low power radio protocol and utilize frequency shift keying (FSK). Transceiver 56 can achieve a bit rate of 9600 kilobit per second. Preferably, transceiver device is configured to communicate using IEEE 802.11 wireless communication standard, however, various other wireless communication standards, frequencies and modulation schemes may be used.

With reference to FIGS. 4B-C, mobile device 13a-b executing locator software is shown as handheld computer 59 and is preferably a commercially available handheld computer 59 (PDA). Handheld computer 59 may be a pocket PC 0S2003-based device and memory 60 preferably includes at least 512 megabytes of RAM. In addition, memory 60 can include or alternatively be flash memory, EEPROM, or any device for providing storage. Handheld computer 59 can be Axim® X 13, manufactured by Dell. Handheld computer 59 preferably includes an integrated transceiver 56 and antenna 52 configured for wireless communication. Alternatively, handheld computer 59 may include a plug-in RF module 57. Plug-in RF module 57 can utilize a compact flash, low power transceiver.

Display 54, a user interface 58, memory 60 and synchronization circuit 62 are implemented by handheld computer 59. Transceiver 56 may be integrated into handheld computer 59 or implemented by RF module 57. The use of handheld computer 59 provides significant hardware cost savings, reduces training time because handheld computer 59 has an already recognized easy to use interface, and allows unit 13a-b to be incorporated into equipment already carried by the user.

User interface 58 is preferably a touch screen associated with computer 59 (a commercially available handheld computer). Display 54 is preferably a color LCD display associated with computer 59. Preferably, transceiver 56 is integrated into handheld computer 59. Alternatively, module 57 can slide into the compact flash Type 2 slot in computer 59. In another alternative, module 57 can be a non-plug-in device coupled to handheld computer 59 by a connector (e.g., USB, FireWire, RJ45, RCA, coaxial).

Figure 5:
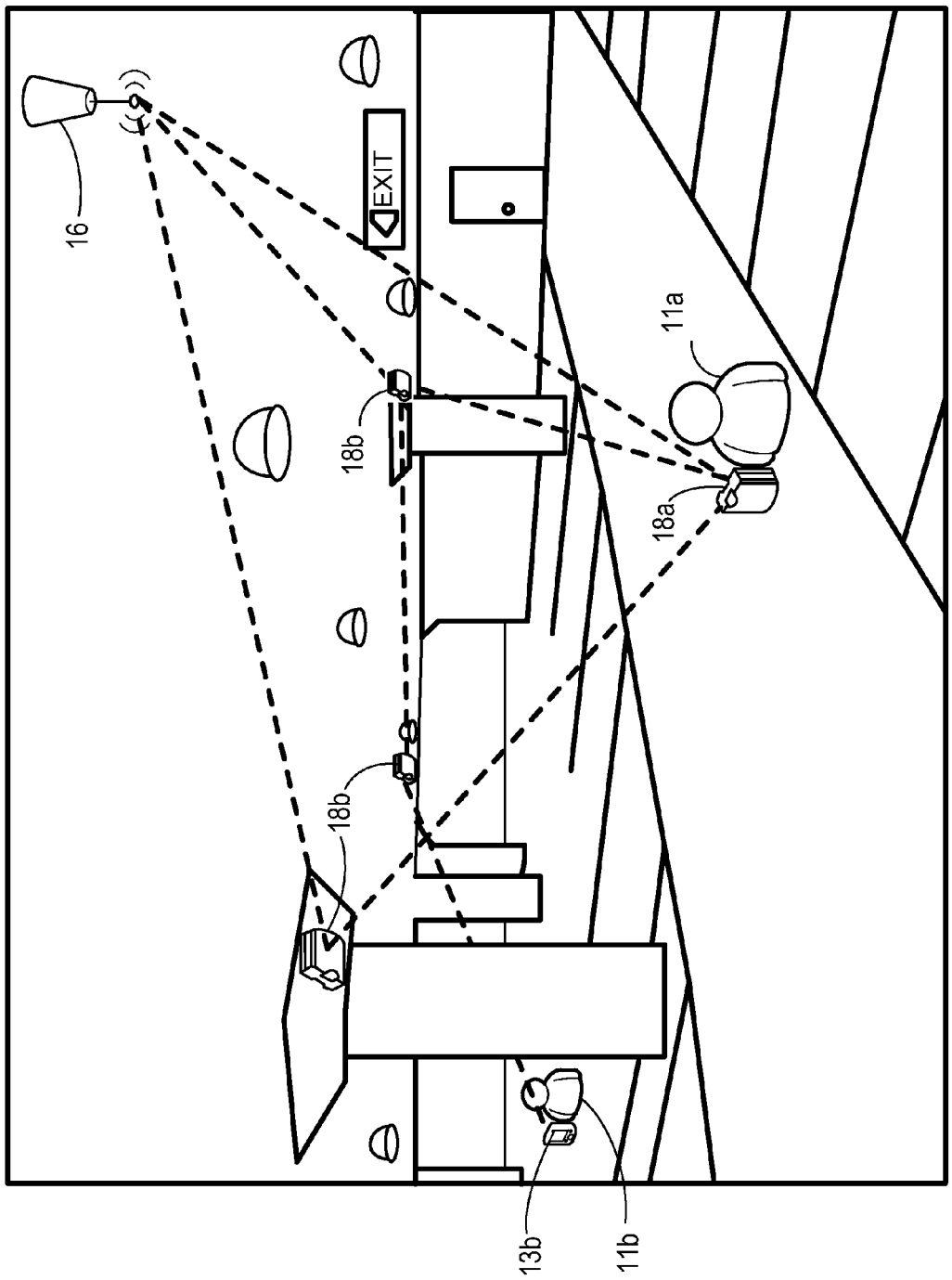
FIG. 5 is a perspective view of a parking garage with a wireless mesh network configuration for enabling an emergency responder to locate a distressed person in accordance with another exemplary embodiment.

Referring to FIG. 5, a parking garage, including a wireless mesh configuration for tracking and locating call tag 18*a*, is illustrated. The wireless mesh network is created from multiple reference tags 18*b* and AP 16 positioned at various locations throughout the parking garage. In the mesh configuration, call tag 18*a* will transmit packets of collected information to reference tags 18*b* and AP 16, which may then deliver the collected packets to the network, such as LAN 17, and then to positioning service 14. The packets may be delivered to the network via a wired or wireless connection from a designated reference tag 18*b* or AP 16. In the event of an emergency situation in the parking garage, distressed person 11*a* uses call tag 18*a* to generate an alert signal. The alert signal may be generated by pressing a button on call tag 18*a* or by sensing an environmental condition. The alert signal is delivered over the wireless mesh network using reference tags 18*b* and AP 16 to positioning service 14. The location of the call tag 18*a* is determined and the end user 11*c* is provided with the alert signal and the location of the call tag 18*a*. Emergency responder 11*b* is notified via mobile device 13*b* of the alert and the location of call tag 18*a*. Emergency responder 11*b* and/or end user 11*c* may acknowledge that the alert has been received and help is on the way. The acknowledgement is relayed to call tag 18*a*, and, as mentioned above, call tag 18*a* may be configured to notify distressed person 11*a* that help is on the way (e.g., blinking LED).

Emergency responder 11*b* attempts to locate distressed person 11*a* by using mobile device 13*b*. Mobile device 13*b* communicates with positioning service 14, which is able to determine the location of mobile device 13*b* and call tag 18*a* using the RSSI or TOF values measured from the surrounding reference tags 18*b* in the wireless mesh configuration. Mobile device 13*b* may be configured to display a map of the coverage area, including markers representing mobile device 13*b* and call tag 18*a*. Reference tags 18*b* may also be displayed on the map. Preferably, the graphical representation of the markers for mobile device 13*b*, call tag 18*a* and reference tag 18*b* are different. As emergency responder 11*b* moves closer to call tag 18*a*, the markers on mobile device 13*b* are updated to show the current location of mobile device 13*b* and call tag 18*a*. In this way emergency responder 11*b* locates distressed person 11*a*. The mapping feature is further described in co-pending U.S. patent application Ser. No. 12/036,136 entitled "WIRELESS MESH NETWORK FOR AN ASSET TRACKING SYSTEM" and co-pending U.S. patent application Ser. No. 12/178,480 entitled "ASSET TRACKING SYSTEM" both of which are assigned to the assignee of the present application and incorporated herein by reference in their entireties.

Mobile device 13*b* may also be configured to operate in a normal finding mode to detect whether tag units 18*a*-*b* are in a particular coverage area, or in a tracking mode to find a tag unit 18*a*-*b* (whether or not the unit is in the particular coverage area). Tag units 18*a*-*b* may be configured to provide a periodic, locating beacon signal that can be received by mobile device 13*b*. The beacon signal can be utilized by mobile device 13*b* to determine a location of, or relative distance to, a call tag 18*a* when it has left a coverage area (e.g., if distressed person 11*a* is located in a hole in the coverage area). The periodic beacon signal can be provided in response to an interrogation signal from mobile device 13*b*. Alternatively, the beacon signal can be automatically provided by tag units 18*a*-*b* for predetermined periods of time and/or at predetermined intervals. The length of the intervals may change depending on the mode of operation of the tag units 18*a*-*b* (e.g., shorter periods between transmissions when in alter mode).

Mobile device 13*b* may be configured to perform a continuous roll call of all tag units 18*a*-*b* within a range (e.g., settable and up to 1000 ft.) of mobile device 13*b* in the ranger mode. The roll call may further be restricted to call tags 18*a* or by regions within the coverage area. If a call tag 18*a*, from which an alert signal has been generated, leaves the coverage area of mobile device 13*b*, an alert can be issued from mobile device 13*b* indicating that a call tag 18*a* has left the area.

Emergency responder 11*b* can also configure mobile device 13*b* in a tracker mode to search for call tag 18*a* utilizing a directional antenna, such as the one describe in U.S. Pat. No. 7,365,645. When call tag 18*a* receives a tracking message (interrogation signal) from mobile device 13*b*, call unit 18*a* may be configured to respond with a beacon signal and enter into a fast poll mode to allow very fast poll responses, thereby allowing superior tracking. Call tag 18*a* and mobile device 13*b* may be configured to enter the fast poll mode for a predetermined period of time, after which, both mobile device 13*b* and call tag 18*a* go back to a normal poll sequence.

In both range mode and tracker mode, mobile device 13*b* attempts to communicate directly with call tag 18*a* and to determine a relative direction and distance from mobile device 13*b* using collected RSSI or TOF information. In this way, emergency responder 11*b* may quickly locate distressed person 11*a* in the parking garage even if distressed person 11*a* is moving or is located in a hole in the coverage area. Furthermore, historical and/or statistical information provided by positioning service 14 can assist mobile device 13*b* when in normal finding mode and tracking mode in determining the relative direction and distance from mobile device 13*b*. For example, if call tag 18*a* leaves a coverage area, positioning service may provide a last known location of call tag 18*a*, which may provide a general direction and minimum distance of call tag 18*a* from mobile device 13*b*. This additional information provided by positioning service 14 can help narrow the search area and improve the ability of mobile device 13*b* to locate call tag 18*a* using direct communication.

Normal finding mode and tracking mode are initiated and performed by mobile device 13*b*. As described above, call tag 18*a* may enter into alert mode when a panic signal is initiated. Alternatively, alert mode may be entered into when an alert signal is generated by call tag 18*a*. If distressed person 11*a* initiates alert mode in the parking garage, call tag 18*a* attempts to communicate directly with mobile device 13*b* when mobile device 13*b* is within range of call tag 18*a*, even if there is no supporting wireless infrastructure (e.g., no reference tags 18*b* or access points 16). As previously stated, direct communication between mobile device 13*b* and call tag 18*a* is particularly helpful when there are holes in the wireless coverage area, or when the distressed person is moving (e.g., running).

Figure 6A:
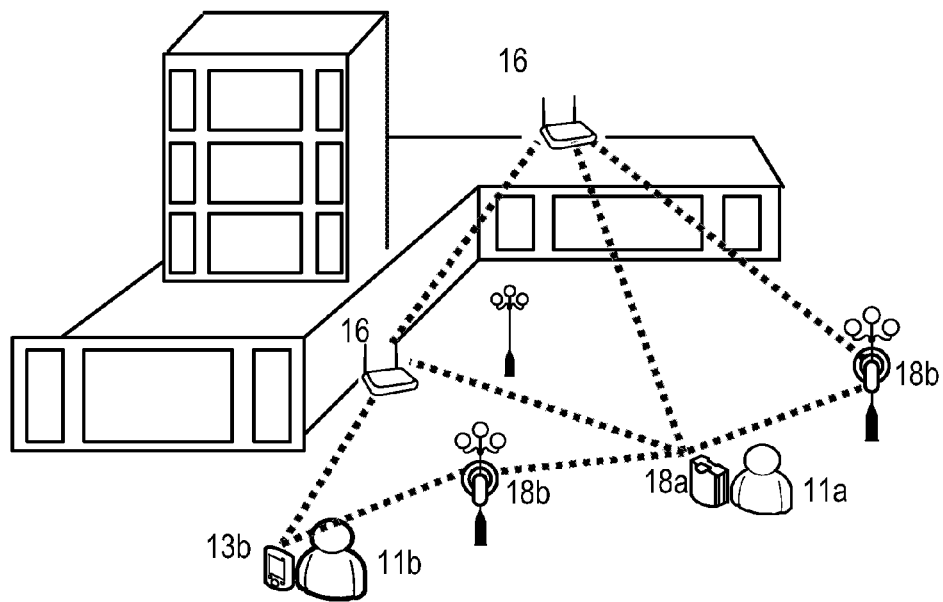
FIG. 6A illustrates a wireless mesh network configuration for locating a distressed person, where the distressed person is located within the coverage area, in accordance with another exemplary embodiment.

Referring to FIG. 6A, distressed person 11*a* located within the coverage area and sends an alert. Emergency responder 11*b*, also within the coverage area, uses mobile device 13*b* to connect to the wireless mesh network comprising AP(s) 16 and reference tags 18*b*. Positioning service 14 may be used to determine the location of call tag 18*a* and mobile device 13*b* and publish the location information on mobile device 13*b*.

Conversely, call tag 18a and/or mobile device 13b may be configured to be self-locating devices using the known positions of the reference tags 18b and AP(s) 16. Mobile device 13b user interface may use visual indicators, such as position markers on a map or signal strength bar graphs, assists emergency responder 11b in locating distressed person 11a.

Figure 6B:
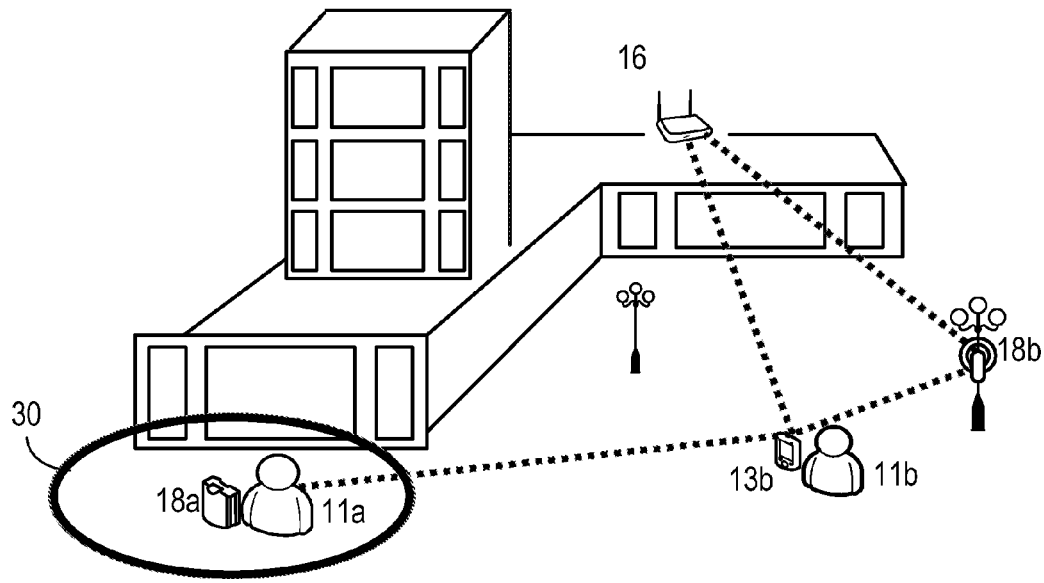
FIG. 6B illustrates a wireless mesh network configuration for locating a distressed person, where the distressed person is located outside the coverage area, in accordance with another exemplary embodiment.

FIG. 6B illustrates a situation where distressed person is located in a coverage area hole 30, such that AP 16 and reference tag 18b are unable to communicate with call tag 18a. In this situation, when a distressed person 11a initiates alert mode on call tag 18a, call tag 18a attempts to contact the wireless mesh network and/or mobile device 13b by periodically transmitting a signal. Mobile device 13b responds and determines a relative direction and distance using RSSI and/or TOF information. Alternatively, rather than enter normal finding mode, mobile device 13b may enter tracking mode. In tracking mode, mobile device 13b transmits an interrogation signal causing call tag 18a to respond with a beacon signal and to enter into a fast poll mode. Mobile device 13b rapidly and continuously polls call tag 18a for a predetermined period of time to determine the relative direction and distance of call tag 18a. A directional antenna, such as antenna 57C describe in U.S. Pat. No. 7,365,645, may be utilized to improve the determination of the relative direction of call tag 18a.

Figure 7A:
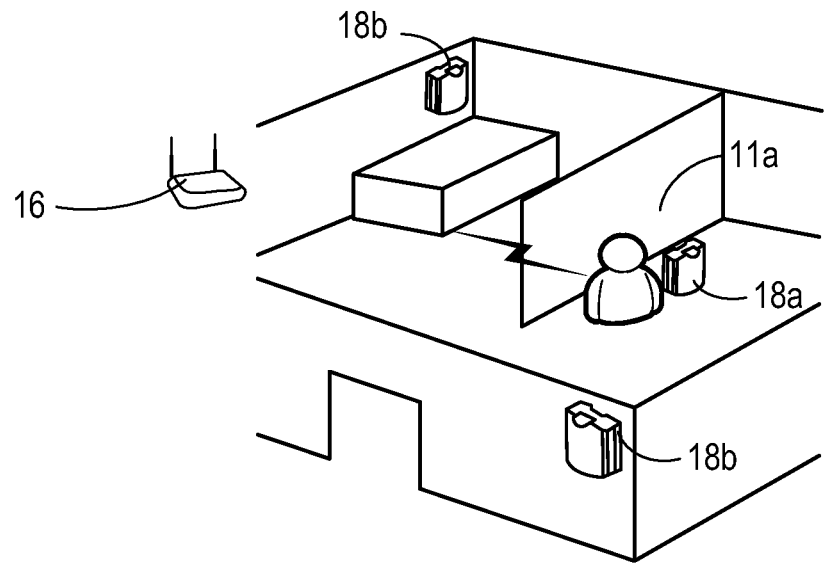
FIG. 7A is a perspective view of a care facility environment in which a wireless mesh network configuration is employed for locating a distressed person in accordance with another exemplary embodiment.

Referring to FIG. 7A, emergency response locator system 10 may also be utilized by organizations, such as hospitals, nursing homes or other types of care facilities to locate individuals needing immediate assistance. Reference tags 18b are battery powered making it easy to expand the wireless coverage area by affixing reference tags 18b at various locations in the care facility. The location of the various reference tags 18b and AP(s) 16 through out the facility and determined during installation, thereby providing reference points for determining the location of caller tags 18a and mobile devices 13a-b as the caller tags 18a and mobile devices 13a-b move throughout the facility. Distressed person 11a carries call tag 18a, which may be used to request assistance in the event of an emergency. When an emergency event arises, distressed person 11a presses at least one button on call tag 18a, which communicates an alert signal to positioning service 14. Positioning service 14 determines the location of call tag 18a and provides the alert and the call tag 18a location to end user 11c and emergency responder 11b. Once the location of call tag 18a is determined, call tag 18a may notified and may be configured to provide an indication, such as a blinking LED, to distressed person 11a that help is on the way.

Figure 7B:
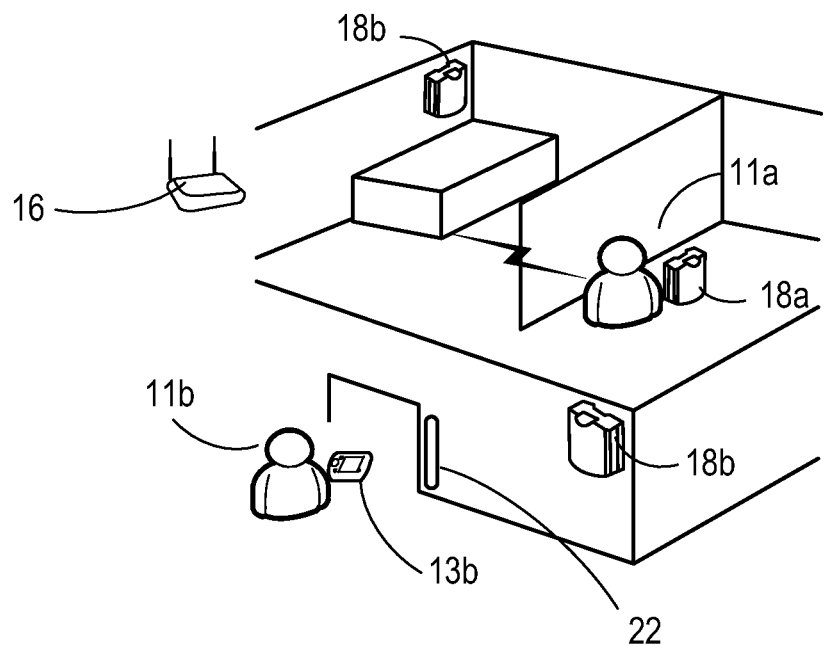
FIG. 7B is a perspective view of a care facility environment in which an emergency responder is attempting to locate a distressed person in response to a transmitted alert signal accordance with another exemplary embodiment.

Referring to FIG. 7B, emergency responder 11b uses mobile device 13b to locate call tag 18a. The care facility may provide secured areas for the safety of the residents or patients of the facility. The doors securing the secured areas of the facility may be configured with Wi-Fi or 262 kHz door receiver 22 as described in co-pending U.S. patent application Ser. No. 12/036,136 and co-pending U.S. patent application Ser. No. 12/178,480. As emergency responder 11b approaches the secured area with mobile device 13b, the doors controlled by receiver 22 automatically open to provide emergency responder 11b access to the secured area in order to locate and assist distressed person 11a. Distressed person 11a may also initiate an alert or panic signal. Call tag 18a may be configured to enter alert mode once an alert or panic signal is initiated. Call tag 18a may be configured to remain in alert mode until the alert or panic signal is deactivated by emergency responder 11b using mobile device 13b. The alert or panic signal can be deactivated automatically when mobile device 13b is within a predetermined proximity (e.g. five feet) of call tag 18a, or emergency responder 11b may be required to deactivate it via the user interface of mobile device 13b. Alert mode allows mobile device 13b to locate call tag 18a even if there is no wireless coverage in the immediate area (e.g., 150 ft radius around call tag 18a). In alert mode, call tag 18a may be configured to attempt to communicate directly with mobile device 13b to determine a relative direction and distance from mobile device 13b to call tag 18a.

Mobile device 13b may also be configured to display a picture of distressed person 11a, their name and the signal strength associated with the signal received from call tag 18a. The picture of the distressed person 11b and other persons in the facility may be stored in a central database and automatically loaded onto mobile device 13b when the alert signal and location information is provided to mobile device 13b. Alternatively, the pictures may be stored on mobile device 13b. The signal strength can be displayed on a bar graph.

Mobile device 13b may also enter tracking mode. In tracking mode, emergency responder 11b may use a directional antenna with mobile device 13b to determine the location of distressed person 11a. When tracking, mobile device transmits an interrogation signal and call tag 18a responds to the interrogation signal with an interrogation response beacon signal.

Figure 8:
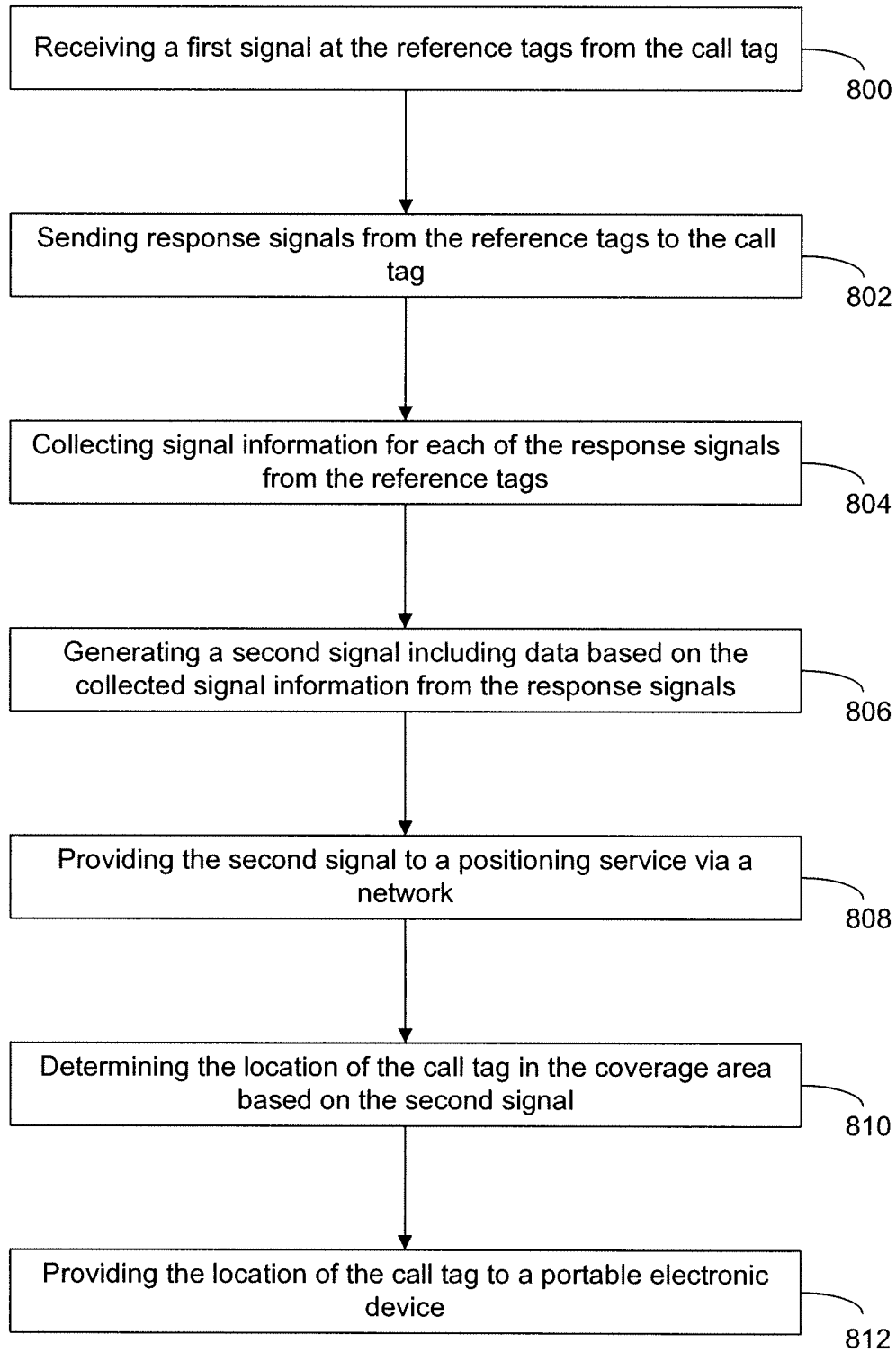
FIG. 8 is a flow diagram showing the steps for locating a distress person in accordance with another exemplary embodiment.

Referring to FIG. 8, a method for locating a call tag in a coverage area is shown. In step 800 reference tags 18b receive a first signal from the call tag. Access points 16 may also receive the first signal. The first signal may be a probe request message signal that requests a response signal from the reference tags 18b.

In step 802, the reference tags 18b send response signal to the call tag. Alternatively, as described above, reference tag 18b can send a special message to tag units 18a-b at a preconfigured time interval. Reference tags 18b synchronize with each other in order to send their messages at approximately the same time. Call tag 18a wakes to listen for messages from all reference tags 18b. Under this scenario, call tag 18a does not need to send a probe request message to reference tag 18b. However, a probe request message may be needed when communicating with AP 16.

After receiving signals from reference tags 18b, in step 804, call tag 18a collects signal information from each of the response signals from the reference tags 18b. The signal information may include RSSI information, TOF information or any other type of signal information useful in determining the location of call tag 18a.

In step 806, call tag 18a generates a second signal including data based on the collected signal information of the response signals. In step 808, the second signal is provided to a positioning service via a network (e.g., LAN). The second signal may be provided to positioning service 14 by transmitting the second signal from the call tag 18a to a reference tag 18b coupled to the network or to an access point coupled to the network.

In step 810, the location of the call tag 18a in the coverage area is determined based on the information provided in the second signal. The positioning service 14 may be configured to analyze the information, such as the RSSI and TOF information to determine the approximate distance of the call tag 18a from each of the reference tags 18b. In step 812, the location of the call tag 18a is provided to a portable electronic device, such as mobile device 13b. The location of the call tag 18a may be used by an emergency responder carrying mobile device 13b to locate distressed person 11a carrying call 18a in the coverage area.

Figure 9:
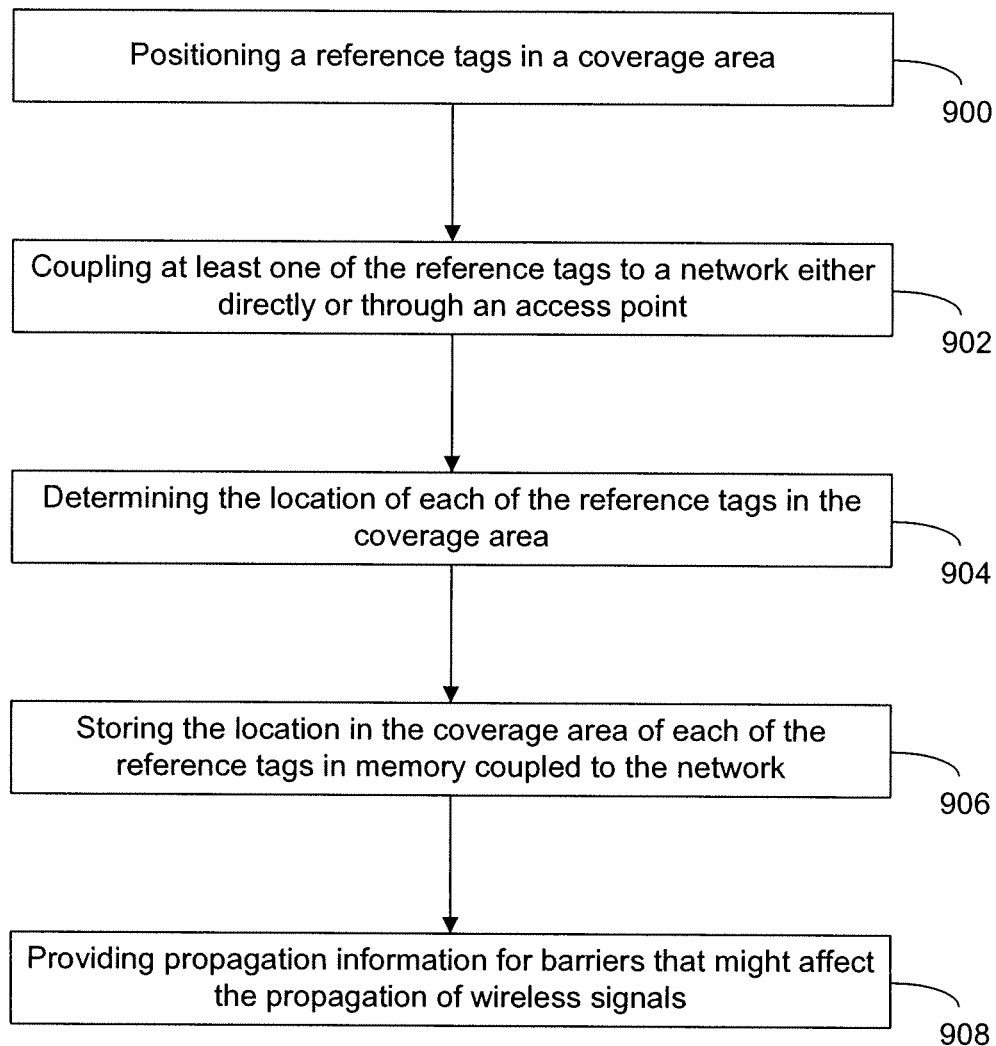
FIG. 9 is a flow diagram showing the steps for configuring a wireless mesh emergency response network in accordance with another exemplary embodiment.

Referring to FIG. 9, a method for configuring or installing an emergency response locator system is illustrated. In step 900, the reference tags 18b are positioned in the coverage.

The reference tags 18b may be used to increase the coverage density of an existing wireless network to increase location determining accuracy, to expand the size of the coverage area, or both. In step 902, at least one of the reference tags 18b is coupled to a network, such as a local area network (LAN) or a wide area network (WAN), either directly as a client on the network or through a network device, such as an access point 16. Step 902 may also be performed after steps 904, 906 or 908.

In step 904, the location of each of the reference tags 18b in the coverage area is determined at the positioning system, such as positioning service 14. This may be accomplished by uploading or creating a floor plan of the coverage area in a software program and identifying the location of each of the reference tags 18b and access points 16. The location data may be entered using various data entry methods, including a drag and drop method where an icon representing the reference tag is selected and dragged to the spot on the floor plan where the reference tag is located. In step 906, the location of the each of the reference tags in the coverage area is stored in memory coupled to the network. The memory may be integrated into positioning service 14 or provided in a server, workstation or other electronic devices coupled to the network. In addition to storing information related to the reference tags 18b, propagation information for barriers in the coverage area that might affect the propagation of wireless signals may be provided. For example, a wall structure may attenuate signals passing through the wall resulting in a weaker signal than expected by the receiving device. This attenuation may be accounted for by providing the positioning system with the location and propagation information (e.g., attenuation factors) for the barriers in the coverage area.

It is understood that, while preferred embodiments, examples and values are given, they are for the purpose of illustration only. The apparatus and method of the invention are not limited to the precise details and conditions disclosed. For example, although specific geometries, ranges, and protocols and types of operations are described, other algorithms, dimensions, and protocols could be utilized. Thus, changes may be made to the details disclosed without departing from the spirit of the invention, which is defined by the following claims.

What is claimed is:

1. A system for use with a plurality of reference tags disposed at respective reference locations in a coverage area and configured to form a wireless mesh network, the system comprising:
   a first tag configured to communicate with the plurality of reference tags wherein the first tag operates in a sleep mode and includes a motion sensor, wherein the first tag is woken out of the sleep mode on a first periodic basis to communicate with the reference tags, wherein the first tag is woken out of the sleep mode at a second periodic basis in response to a motion signal from the motion sensor, the second periodic basis being more frequent than the first periodic basis; and
   a positioning system configured to receive data related to a communication between the first tag and the plurality of the reference tags, the positioning system being configured to process the data to determine a location of the first tag.

2. The system of claim 1, wherein the first tag is an asset tag.

3. The system of claim 1, wherein the data is related to signal strength.

4. The system of claim 1, further comprising:
   an access point configured to couple the positioning system to the wireless mesh network.

5. The system of claim 1, wherein the first tag provides a periodic transmission of a first signal, wherein a portable electronic device is configured to directly receive the first signal when the portable electronic device is within range of the first tag.

6. The system of claim 5, wherein the periodic transmission of the first signal is configured to stop when the portable electronic device is within a predetermined range of the first tag.

7. The system of claim 5, wherein the periodic transmission of the first signal is configured to continue until deactivated by the portable electronic device.

8. The system of claim 1, wherein a portable electronic device is configured to directly communicate with a call tag when the portable electronic device is within range of the first tag.

9. The system of claim 8, wherein the positioning system is configured to provide the portable electronic device with a last known location of the first tag if the first tag can no longer be identified by the positioning system.

10. In a system for use with a plurality of reference tags disposed at reference locations in a coverage area and configured to form a wireless mesh network, a tag unit comprising:
    a processor configured to communicate with the plurality of reference tags and to collect data regarding communication with the plurality of reference tags; and
    a motion sensor, wherein the tag unit operates in a sleep mode, wherein the tag unit is woken out of the sleep mode on a first periodic basis to communicate with the reference tags, wherein the tag unit is woken out of the sleep mode at a second periodic basis in response to a motion signal from the motion sensor, the second periodic basis being more frequent than the first periodic basis.

11. The tag unit of claim 10, further comprising:
    a portable electronic device configured to communicate with the wireless mesh network and the tag unit and to receive positioning information for locating the tag unit in the coverage area.

12. The tag unit of claim 10, wherein the plurality of reference tags and the tag unit are configured to communicate using an IEEE 802.11 standard.

13. The tag unit of claim 10, wherein the plurality of reference tags are coupled to a local area network (LAN).

14. The tag unit of claim 13, wherein the local area network is a wireless local area network (WLAN).

15. The tag unit of claim 13, wherein a first signal is sent to a remote emergency responder, wherein the first signal includes location information of the tag unit in the coverage area.

16. A method of determining a location of a tag unit in a wireless emergency response network, the method comprising:
    waking the tag unit from a sleep mode on a first periodic basis to communicate with a plurality of reference tags disposed in a coverage area;
    waking the tag unit from the sleep mode at a second periodic basis in response to a motion signal from a motion sensor, the second periodic basis being more frequent than the first periodic basis; and
    determining the location of the tag unit in the coverage area based on data associated with communication between the tag unit and the reference tags.

17. The method of claim 16, further comprising:
determining the location of the tag unit in the coverage area based on signal strengths of the communication.

18. The method of claim 16, further comprises:
providing the location of the tag unit in the coverage area to a portable electronic device, wherein the portable electronic device is configured to communicate with the reference tags.

19. The method of claim 18, wherein the portable electronic device is configured to communicate directly with the tag unit when the tag unit is within range of the portable electronic device.

20. The method of claim 19, wherein the plurality of reference tags are coupled to the network via an access point.

* * * * *